May 22, 1923.
F. MACKENSEN
ASPARAGUS CUTTER
Filed May 25, 1922
1,455,797
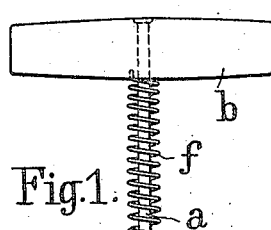
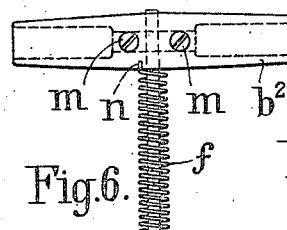
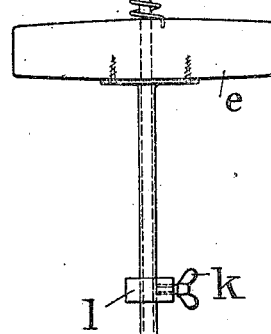
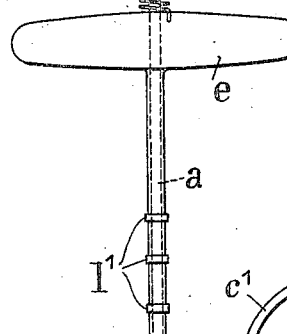
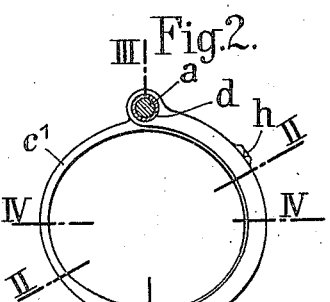
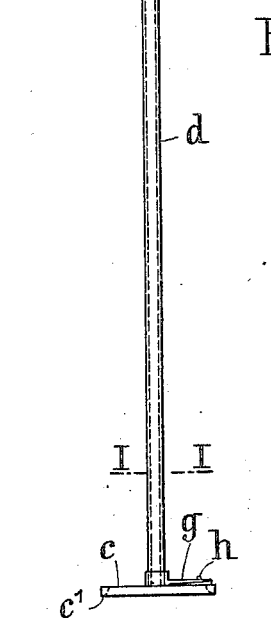
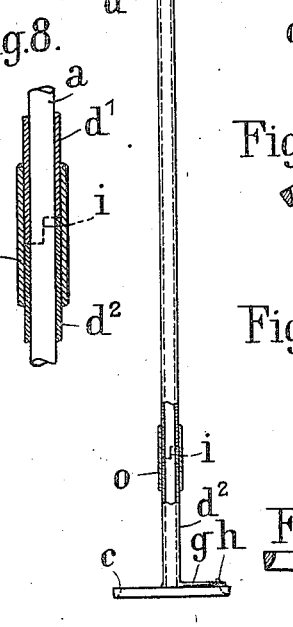
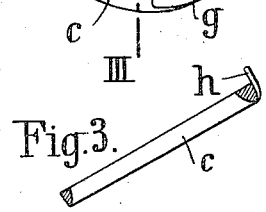
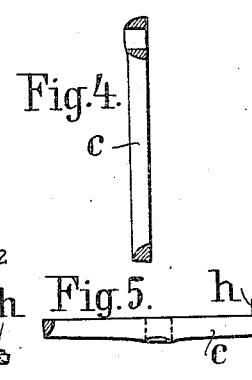
Inventor
Fritz Mackensen
by *[signature]*
Attorney.

Patented May 22, 1923.

1,455,797

UNITED STATES PATENT OFFICE.

FRITZ MACKENSEN, OF WORPSWEDE, NEAR BREMEN, GERMANY.

ASPARAGUS CUTTER.

Application filed May 25, 1922. Serial No. 563,634.

*To all whom it may concern:*

Be it known that I, FRITZ MACKENSEN, painter, a citizen of the German Republic, and residing at Worpswede, near Bremen, Germany, have invented an Improvement in a new and useful Asparagus Cutter, of which the following description, in connection with the accompanying drawing, is a full specification, like characters on the drawing representing like parts.

My invention relates to a new or improved asparagus-cutter which is provided with a guide-ring embracing the stalk of the asparagus, when the cutter is introduced into the soil, and its object is to enable this asparagus to be cut in a simple and reliable manner at a considerable depth below the surface of the bed without the necessity of removing the soil around the stalk, and to prevent injury of the knife or the stalk, no matter whether the latter has grown crooked or obliquely.

An essential feature of the improved cutter consists in arranging the knife-blade in a covered or protected position at the back of the guide-ring, which itself tapers towards the underside. This construction and arrangement of the guide-ring and the knife-blade ensures not only a sure guidance of the asparagus-cutter, but facilitates its penetration into the soil, while it protects the covered blade against damage and the asparagus stalk against injury by the knife of the cutter.

A further feature of novelty of the improved cutter consists in the arrangement of the blade at the lower end of a tube, which is adapted to slide and rotate upon the rod for introducing the knife into the soil. The tube is at its upper end provided with a handle for operating the knife-blade, and is acted upon by a spring constantly pressing the blade down against the upper face or back of the guide-ring and against a stop at the outer side of the guide-ring, which stop is preferably formed as knife-edge so that no sand can settle between the back of the knife and the stop.

In a preferred construction of the cutter, provisions are made to enable it to be easily taken to pieces for cleaning purposes and to exchange the blade. With this end in view, the tube upon the rod for introducing the knife is made in two parts, one of which is provided with the handle and the other of which carries the blade, and which are geared together by a suitable coupling or clutch.

Further novel features will be described with reference to the accompanying drawings, in which the improved cutter is shown in two constructions by way of example.

Fig. 1 illustrates the improved cutter in side-elevation,

Fig. 2 the lower part of the cutter in sectional plan viewed from line I—I of Fig. 1, on a larger scale, Fig. 3 a cross-section through the guide-ring with the knife-blade removed, along line II—II of Fig. 2, Fig. 4 a cross-section through the ring along line III—III of Fig. 2, Fig. 5 a cross-section through the ring along line IV—IV of Fig. 2, Fig. 6 a sectional side-elevation of a modified construction, Fig. 7 an end-elevation viewed from the right of the upper part of the cutter in Fig. 6, and Fig. 8 on a larger scale a longitudinal section through an example of a coupling between the rotary tube and the sleeve of the blade.

The improved asparagus-cutter comprises a rod $a$ for introducing the knife into the soil. This rod is fitted at its upper end with a suitable handle $b$ and at its lower, preferably reduced end with the guide-ring $c$, which latter may be fixed by soldering, riveting or the like. This ring fits upon or embraces the stalk of the asparagus when it is forced into the soil and is thus guided along it. The guide-ring is so constructed that it effectively covers and protects the knife-blade $g$ described hereinafter, and at the same time facilitates the penetration into the soil. With this end in view, the guide-ring $c$, which at the top is made flat to afford good cover to the blade $g$, is constructed as small as possible, especially at the side $c^1$ opposite to the blade $g$ and preferably converges in its side-elevation as shown in Figs. 3 and 4. For the same purpose, the cross section of the ring is throughout tapering towards the underside, so that the inner wall of the ring is rounded from the upper inner edge to the under outer edge of the ring, as clearly shown in Figs. 3–5.

Upon the rod $a$ is arranged a tube $d$, which at its lower end carries a preferably half-moon shaped or scythe-like knife-blade $g$. At the upper end of the tube $d$, a handle $e$ is attached which is acted upon by a helical spring $f$ wound around to rod $a$. The spring is so disposed and attached, preferably at the two handles $b$ and $e$, that it forces the knife-blade $g$ against the upper face of the guide-ring and simultaneously outward against a stop or abutment $h$. The blade thus always takes up the desired protected position upon the back of the guide-ring. The stop or abutment $h$ limiting the outward movement of the blade, is made as small as possible and preferably of triangular cross-section so that it offers a knife-like edge to the blade, and the deposition of soil upon and interference between it and the back of the blade is effectively prevented. The stop $h$ preferably also merges tapering into the guide-ring. The scythe-like knife-blade $g$ is guided upon the insertion rod $a$ by the tube or sleeve $d$ in such a manner that during its rotation an edging or throwing of the blade cannot take place, and the point of the blade maintains good contact with the upper broad face of the ring $c$.

As clearly shown in Fig. 2, the ring projects at its inner periphery slightly beyond the edge of the blade, so that the blade, in its inoperative position, is well protected, also when the knife is introduced into the soil. The construction is such that after the blade has swept across the orifice of the ring and cut through the asparagus stalk, it projects only very little beyond the ring. The ring may be made oval and the blade in correspondence therewith, or the ring may be circular and the blade semi-circular.

In order to cut the asparagus in uniform lengths, a stop or collar $l$ is provided on the tube $d$ of the instrument, which may be slid along the tube and fixed in an appropriate position corresponding with the desired length of the cut stalk, by a winged screw $k$, for instance.

Referring now to Figs. 6 to 8, it will be seen that the tube or sleeve consists of two parts $d^1$, $d^2$, the latter of which is comparatively short and carries at its lower end the knife-blade $g$. The other, longer part is provided at its upper end with the handle $e$ for rotating the tube. At the place $i$, where the two parts meet, they are so shaped that they engage with each other. For this purpose a claw, tooth or similar clutch or coupling may be provided, which is acted upon by the spring $f$. At one of the parts $d^1$ or $d^2$ a sleeve $o$ or the like is fixed by soldering or in any other manner, which extends beyond the joint and surrounds the coupling or clutch.

In order to prevent damage to the blade when a strong counter-pressure arises, for instance when a foreign body has got jammed between blade and ring or the blade is forced too hard against its stop, the clutch is preferably constructed as free clutch or slip coupling, so that it becomes automatically disengaged when the resistance to the movement of the blade is too great. This may, for instance, be effected by making the claws or teeth conical or rounded.

In this modified construction, the upper handle is also made easily detachable or adjustable upon the rod for introducing the knife into the soil of the bed. The handle then consists preferably of two halves $b^1$ and $b^2$, which are held together by screws $m$, and clamp the upper end of the rod $a$ as well as the end $n$ of the spring $f$ between them. This construction enables the instrument to be easily taken to pieces in order to exchange the blade or clean the cutter. It is only necessary to unscrew the screws $m$, whereupon the handle $b^1$, $b^2$ and all the other parts of the instrument can be taken off the rod $a$. By adjusting the handle $b^1$, $b^2$ along the rod $a$, it is, furthermore, possible to regulate the pressure of the spring $f$ and therewith the frictional contact between the two portions of the clutch at $i$, in order to compensate wear, for instance. In the modification, there are also instead of a single depth mark a plurality of such fixed or adjustable marks or rings $l^1$ provided on the tube portion $d^1$.

The improved asparagus-cutter is operated in the following manner: The upper handle is grasped by the hand, and the ring $c$ is passed over the head of the asparagus stalk, until it rests upon the surface of the bed. Pressure is then exerted upon the upper handle, and the ring is forced into the soil, preferably by turning it continuously to the right and left, until the depth marked by the collar on the tube is reached, the ring sliding along the stalk. After the desired position at which the asparagus should be cut, has been reached, the second handle $e$ nearer the surface of the bed is turned upon the rod $a$ of the instrument against the torsional resistance of the spring $f$ whereby the knife-blade $g$ at the back of the guide-ring $c$ sweeps across the opening of the ring and cuts the asparagus off. The asparagus is then lifted out of the soil by withdrawing the knife by the aid of the upper handle.

It will be understood that the details of the improved cutter may be modified without departing from the spirit of my invention.

What I claim is:

1. The combination, in an asparagus-cutter, of a rod, a handle at one end of said rod and a ring at the other, a tube upon said rod, a scythe-like knife-blade fixed upon the lower end of said tube and arranged at the back of and shaped to be covered by said ring, a handle attached at the upper end of said tube, and a helical spring upon the said rod between said handles adapted to press said blade axially against the back of said ring, substantially as set forth.

2. The combination, in an asparagus-cutter, of a rod, a handle at one end of said rod and a ring at the other, said ring tapering to the underside, a tube upon said rod, a scythelike knife-blade fixed upon the lower end of said tube and arranged at the back of and shaped to be covered by said ring, a handle attached at the upper end of said tube, and a helical spring upon the said rod between said handles adapted to press said blade axially against the back of said ring, substantially as set forth.

3. The combination, in an asparagus cutter, of a rod, a handle at one end of said rod and a ring at the other, said ring tapering to the underside, a projecting stop at the back of the outer periphery of said ring, a tube upon said rod, a scythe-like knife-blade fixed upon the lower end of said tube and arranged at the back of and shaped to be covered by said ring, a handle attached at the upper end of said tube, and a helical spring upon the said rod between said handles adapted to press said blade axially against the back of said ring and laterally against said stop, substantially as set forth.

4. The combination, in an asparagus-cutter, of a rod, a handle at one end of said rod and a ring at the other, a projecting stop at the back of the outer periphery of said ring and provided with a knife-like edge at its inner side, a tube upon said rod, a scythe-like knife-blade fixed upon the lower end of said tube and shaped to be covered by said ring, and a handle attached at the upper end, and a helical spring disposed upon said rod between said handles and fixed with its ends to said handles for pressing said blade axially against the inner face of said ring and laterally against the knife-like edge of said stop upon it, substantially as set forth.

5. The combination, in an asparagus-cutter, of a rod, a handle fixed upon one end of said rod and a ring attached at the other, a projecting stop at the back of the outer periphery of said ring, a tube upon the lower end of said rod, a scythe-like knife-blade fixed upon the lower end of said tube and shaped to be covered by said ring, and a half-clutch upon the upper end, a further tube upon the upper end of said rod, a half clutch at the lower end of said further tube and a handle attached to its upper end, and a helical spring disposed upon said rod between said handles upon said tube and said rod for pressing said half-clutches together and said blade axially against the inner face of said ring and laterally against said stop upon it, substantially as set forth.

6. The combination, in an asparagus-cutter, of a rod, a handle fixed upon one end of said rod and a ring attached at the other, a projecting stop at the back of the outer periphery of said ring, a tube upon the lower end of said rod, a scythe-like knife-blade fixed upon the lower end of said tube and shaped to be covered by said ring, claws formed in the upper end of said tube, a further tube upon the upper end of said rod, claws formed in the lower end of said further tube and gearing with said claws on the first tube, a sleeve fixed upon one of said tubes and covering the joint, a handle attached to the upper end of said upper tube, and a helical spring disposed upon said rod between said handles upon said tube and said rod for keeping said claws in gear and pressing said blade axially against the inner face of said ring and laterally against said stop upon it, substantially as set forth.

7. The combination, in an asparagus-cutter, of a rod, a handle fixed detachably and adjustably at one end of said rod, and a ring at the other, a tube upon said rod, a scythe-like knife-blade fixed upon the lower end of said tube and arranged at the back of and shaped to be covered by said ring, a handle attached at the upper end of said tube, and a helical spring upon the said rod between said handles adapted to press said blade axially against the back of said ring, substantially as set forth.

8. The combination, in an asparagus-cutter, of a rod, a handle fixed upon the flattened upper end of said rod, said handle being longitudinally divided, means for clamping the said halves together, a ring attached to the lower end of said rod, said ring being bevelled at its inner circumference, a projecting stop at the back of the outer periphery of said ring, a tube upon the lower end of said rod, a scythe-like knife-blade fixed upon the lower end of said tube, claws formed in the upper end of said tube, a further tube upon the upper end of said rod, claws formed in the lower end of said further tube and gearing with said claws on the first tube, a sleeve fixed on said tube and adapted to cover said joint between said tubes, a handle attached to the upper end of said upper tube, and a helical spring disposed upon said rod fixed with one end to the handle upon said tube and clamped with the other end between the halves of the handle on said rod and keeping said claw coupling in gear and pressing said blade axially against the inner face of said ring and laterally against said stop upon it, substantially as set forth.

In testimony whereof, I have signed my name to this specification, this second day of May, 1922.

FRITZ MACKENSEN.

In presence of—
A. M. MACKENSEN,
AUGUST QUICK.